Aug. 27, 1940.   W. G. H. FINCH   2,212,970
MULTISTYLUS FACSIMILE RECORDER
Filed Nov. 16, 1938   7 Sheets-Sheet 1

INVENTOR.
William G. H. Finch
BY Ostrolenk & Greene
ATTORNEYS

Aug. 27, 1940.   W. G. H. FINCH   2,212,970
MULTISTYLUS FACSIMILE RECORDER
Filed Nov. 16, 1938   7 Sheets-Sheet 2

INVENTOR.
William G. H. Finch
BY Ostrolenk & Greene
ATTORNEYS

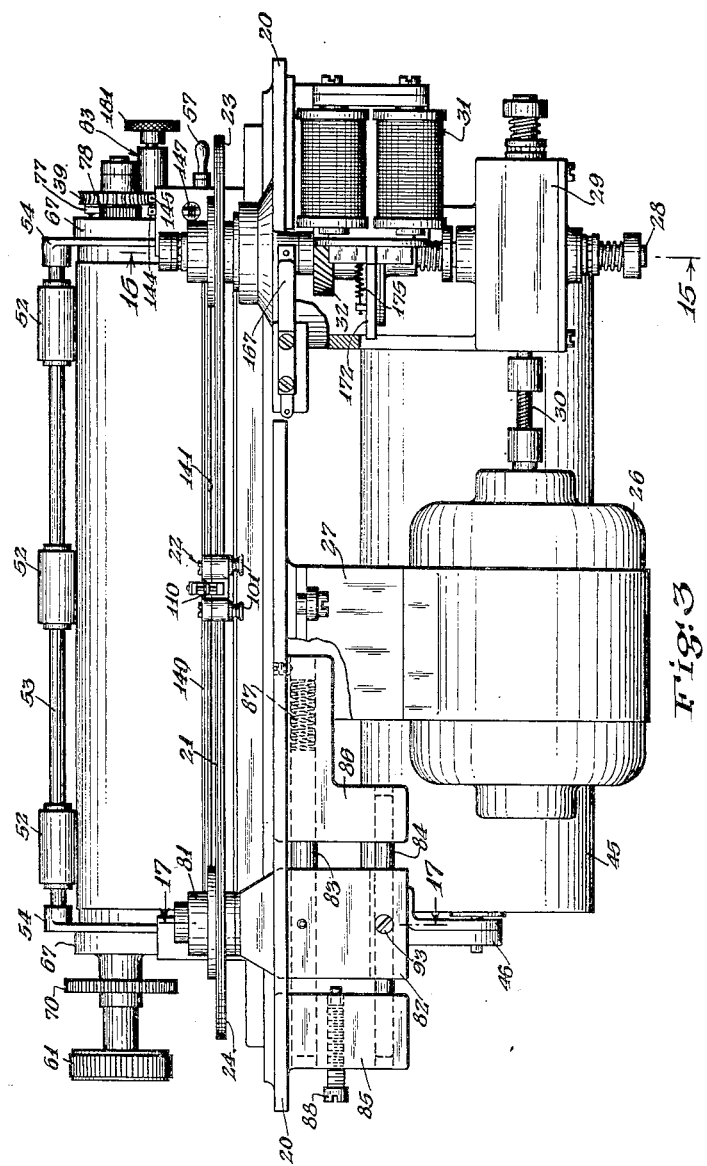

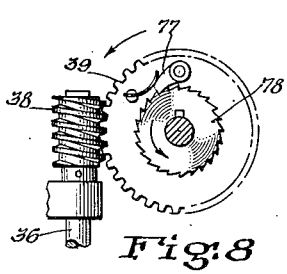
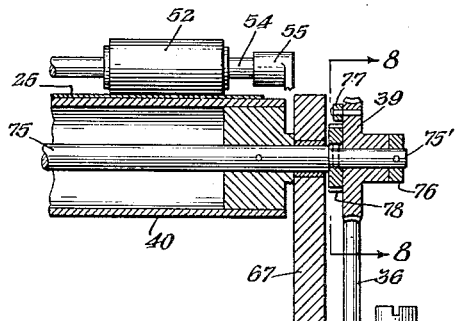
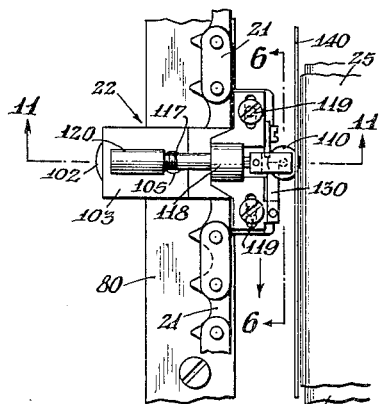
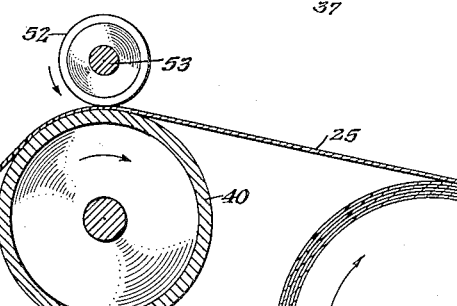
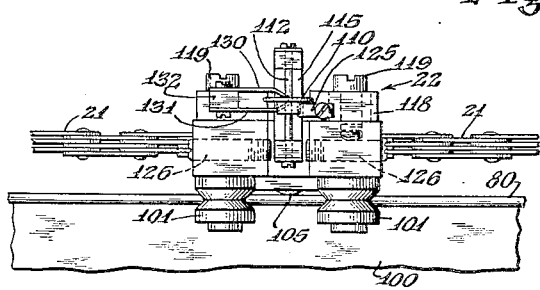
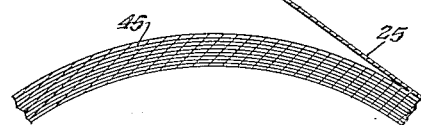

Aug. 27, 1940.  W. G. H. FINCH  2,212,970
MULTISTYLUS FACSIMILE RECORDER
Filed Nov. 16, 1938    7 Sheets-Sheet 5
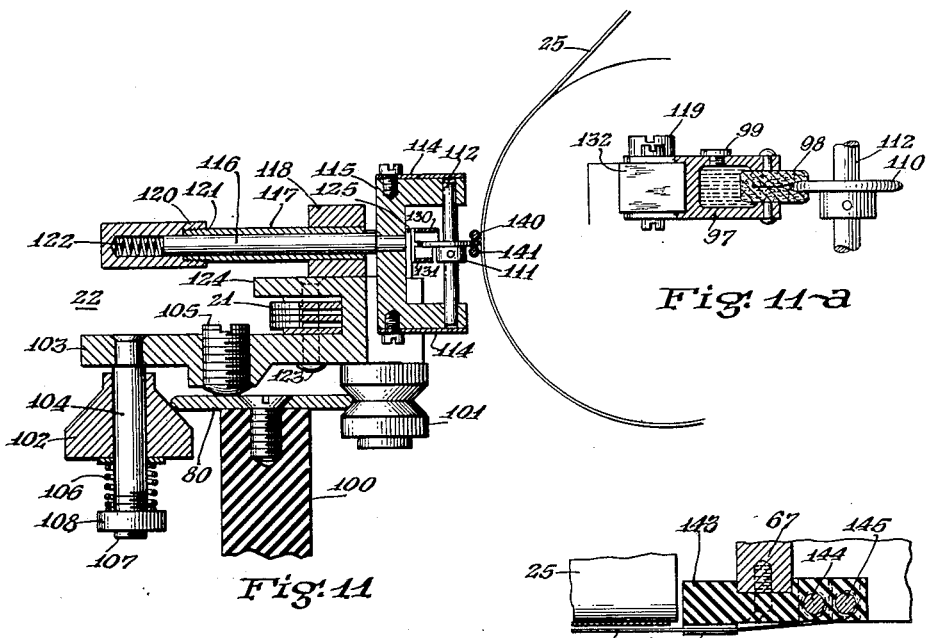
Fig. 11
Fig. 11-a
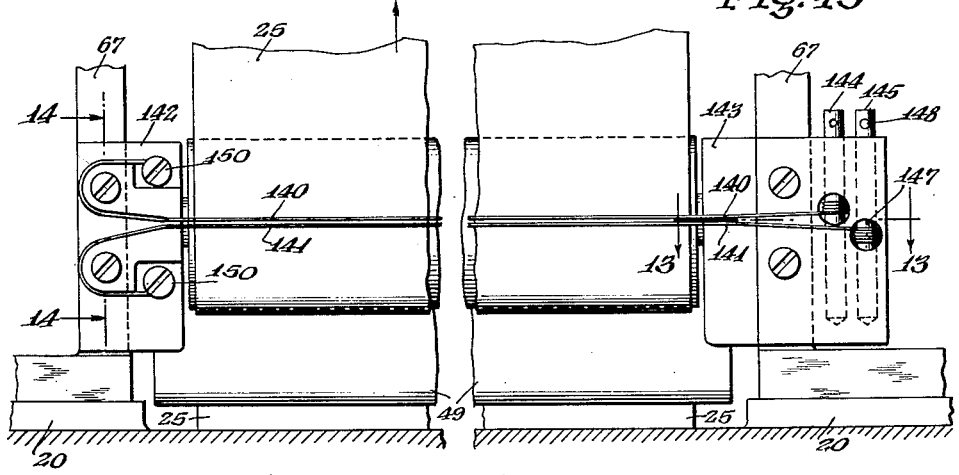
Fig. 13
Fig. 12
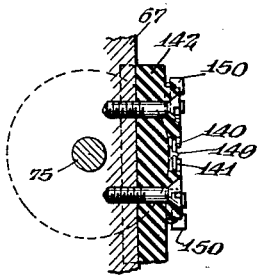
Fig. 14
INVENTOR.
William G. H. Finch
BY Ostrolenk & Greene
ATTORNEYS

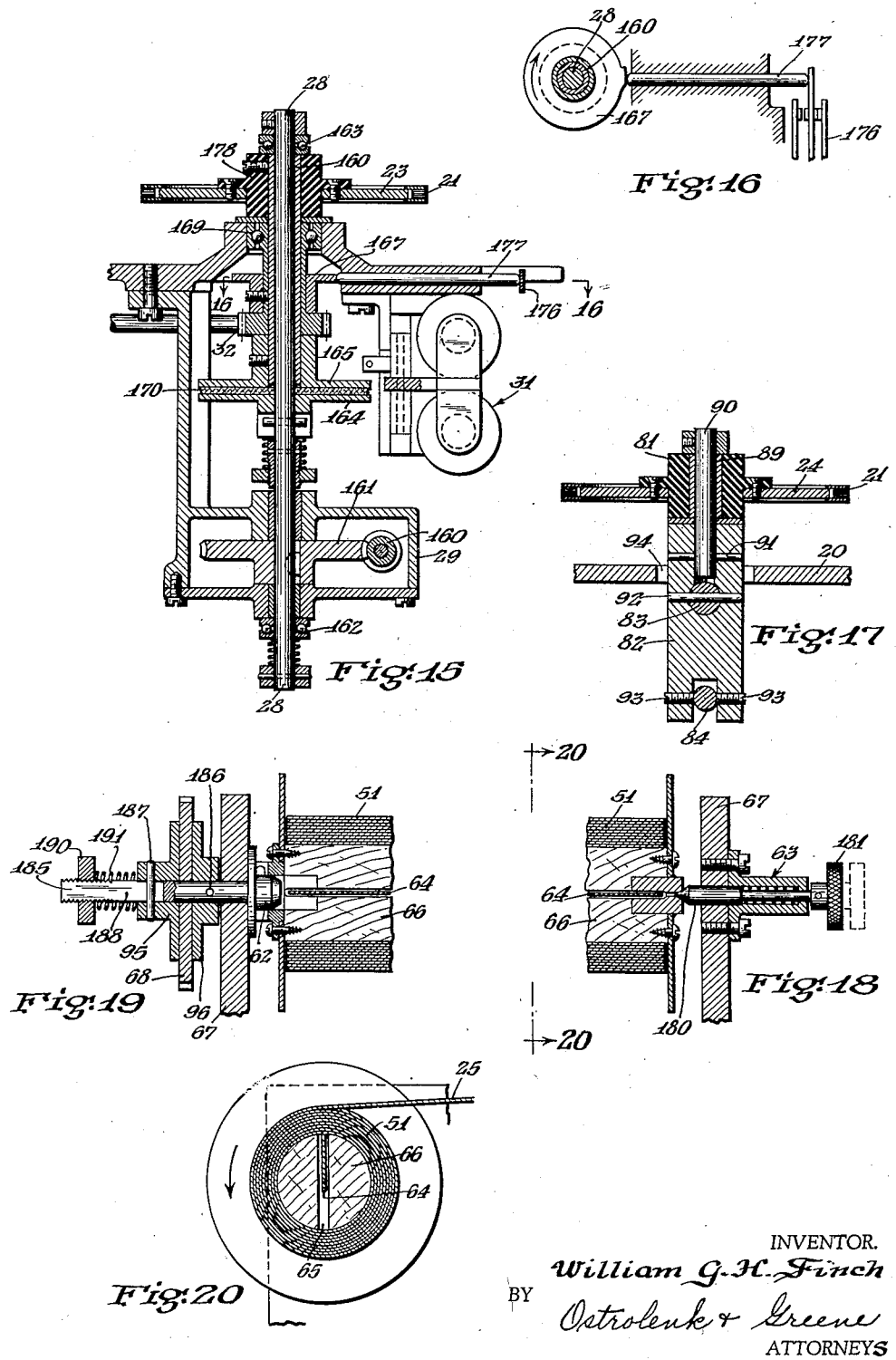

Patented Aug. 27, 1940

2,212,970

UNITED STATES PATENT OFFICE 2,212,970

MULTISTYLUS FACSIMILE RECORDER

William G. H. Finch, Spuyten Duyvil, N. Y.

Application November 16, 1938, Serial No. 240,675

14 Claims. (Cl. 178—11)

This invention relates to facsimile systems, and more particularly relates to improvements in multistylus facsimile recorders. The present case is a continuation-in-part of my co-pending application, S. N. 165,448, filed September 24, 1937, entitled "High speed portable facsimile system."

The present invention is directed to a multistylus facsimile recorder wherein individual styli are spacedly arranged on a common carrier or chain and moved into successive engagement with the recording sheet. Recording on the record sheet occurs during substantially the whole period of each scanning cycle. The styli engage the sheet successively to effect a substantially continuous recording operation.

The present invention is directed to improvements in the construction of a multistylus recorder of the type disclosed in my co-pending application U. S. Serial No. 165,448, filed September 24, 1937, above referred to with a view towards compactness and simplicity of arrangement and with fool-proof operation for quality high-speed recording. The unit is designed for direct viewing of the recording during its progress.

Through extensive experimentation I have found that the fine pointed styli of the prior art wore excessively on high-speed recording, particularly for electrochemical recording operation. In accordance with my present invention I provide a stylus disk in the form of a thin wafer which effects a rolling contact with the recording sheet during recording and obviates excessive wear on the stylus. Another advantage of the stylus disk resides in the simplified arrangement for maintaining the stylus clean from accumulated gummy substances which would otherwise mar the quality of recording.

Another feature of my present invention is to provide a floating stylus arrangement for multistylus recorders together with means for accurately guiding the floating stylus in the recording path. Such construction greatly simplifies any precautions and care as required for rigid alignment of prior multistyli arrangements.

The styli are arranged on a common carrier and in the preferred form are driven by a positive drive arrangement through a sprocket wheel and chain arrangement. In accordance with the present invention I provide means for maintaining the carrier chain uniformly taut to automatically compensate for any wear or tendency to slacken thereof.

It is accordingly an object of my present invention to provide novel and improved multistylus recorder arrangements.

Another object of my invention is to provide a novel stylus assembly and simplified means for aligning and adjusting the styli of a multistylus recorder.

Still another object of my invention is to provide a novel stylus having a rolling contact action to minimize wearing thereof.

A further object of my invention is to provide novel automatic stylus cleansing mechanisms.

Still a further object of my invention is to provide a novel arrangement for maintaining the stylus carrier or chain drive taut.

A further object of my invention is to provide a floating stylus.

The essence of my development of my facsimile recorder development of which the present invention is an important part resides in the paper employed. My facsimile recorder operates on a dry record sheet as distinguished from wet and semi-wet electrolytic recorders or the impact type of recorder in which by impact of the stylus, a record is made. In preparing such a sheet, it not only must be sufficiently conductive to pass currents at relatively low voltages, but must react to small currents of the order of milliamperes which cannot ignite the sheet. Moreover the sheet must be non-inflammable.

Accordingly, a further object of my invention is to provide a dry record sheet for recording at low current and voltage values.

Still another object of my invention is to provide a novel dry record sheet.

These and further objects of my present invention will become apparent in the following description of a preferred embodiment thereof taken in connection with the drawings, in which:

Figure 3 is a front view of the recorder.

Figure 4 is a vertical cross-sectional view taken along 4—4 of Figure 1 showing a stylus assembly in end view in correlation with the associated recorder element.

Figure 5 is a plan view of the stylus assembly corresponding to the view from 5—5 of Figure 4.

Figure 6 is a front view of the stylus assembly viewed from 6—6 of Figure 5.

Figure 7 is a vertical sectional view through the paper feed roller mechanism taken along 7—7 of Figure 1.

Figure 8 is a detailed illustration of the pawl and ratchet arrangement of the platen drive as viewed from 8—8 of Figure 7.

Figure 11 is an enlarged cross-sectional view of the stylus assembly taken along 11—11 of Figure 5.

Figure 11a illustrates a modified form of stylus cleansing mechanism.

Figure 12 is a broken front view of the stylus guide wire arrangement.

Figure 13 is a sectional view taken along 13—13 of Figure 12 showing the stylus guide wire adjusting means.

Figure 14 is a cross-sectional view taken along 14—14 of Figure 12 through the stylus guide wire anchorage.

Figure 15 is a vertical cross-sectional view through the motivating mechanism for the recorder and associated synchronizing arrangement therefor.

Figure 16 is the horizontal view taken along 16—16 of Figure 15 showing the cyclic synchronizing cam arrangement.

Figure 17 is a vertical cross-sectional view through the stylus chain mounting as taken along 17—17 of Figure 3.

Figure 18 is a cross-sectional view of the tail stock end of the paper pick-up roll mounting as taken along 18—18 of Figure 1.

Figure 19 is a cross-sectional view of the clutch end of the paper pick-up roll mounting as taken along 19—19 of Figure 1.

Figure 20 is a sectional view of the paper pick-up roll as viewed from 20—20 in Figure 18.

The recorder of the present invention is arranged for compactness and simplicity of construction and operation consistent with quality high-speed recording. The recorder is designed for mounting in a portable cabinet of the type and size similar to a radio console cabinet, a suitcase, or similar article. The recorder arrangement is also designed for directly viewing the recorded matter as the recording progresses.

Figure 1:
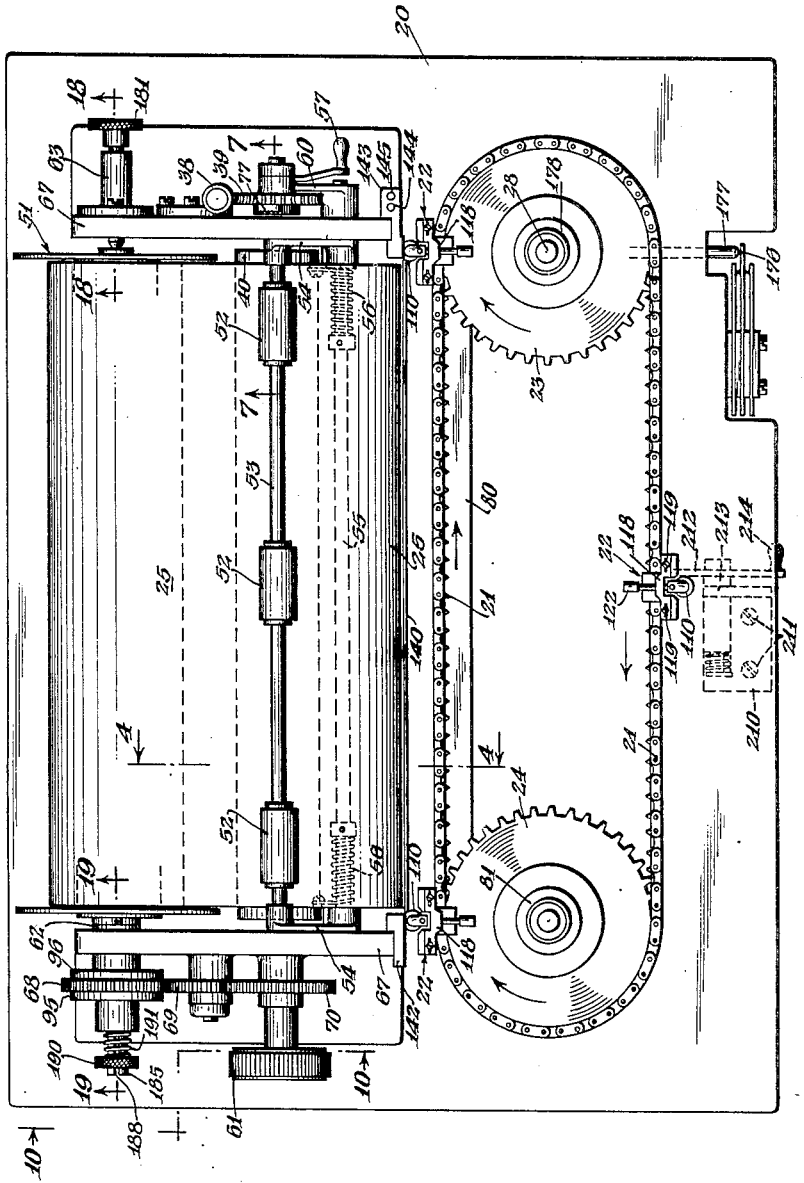
Figure 1 is a plan view with the cover removed of a preferred physical embodiment of the recorder of my present invention.
Figure 2:
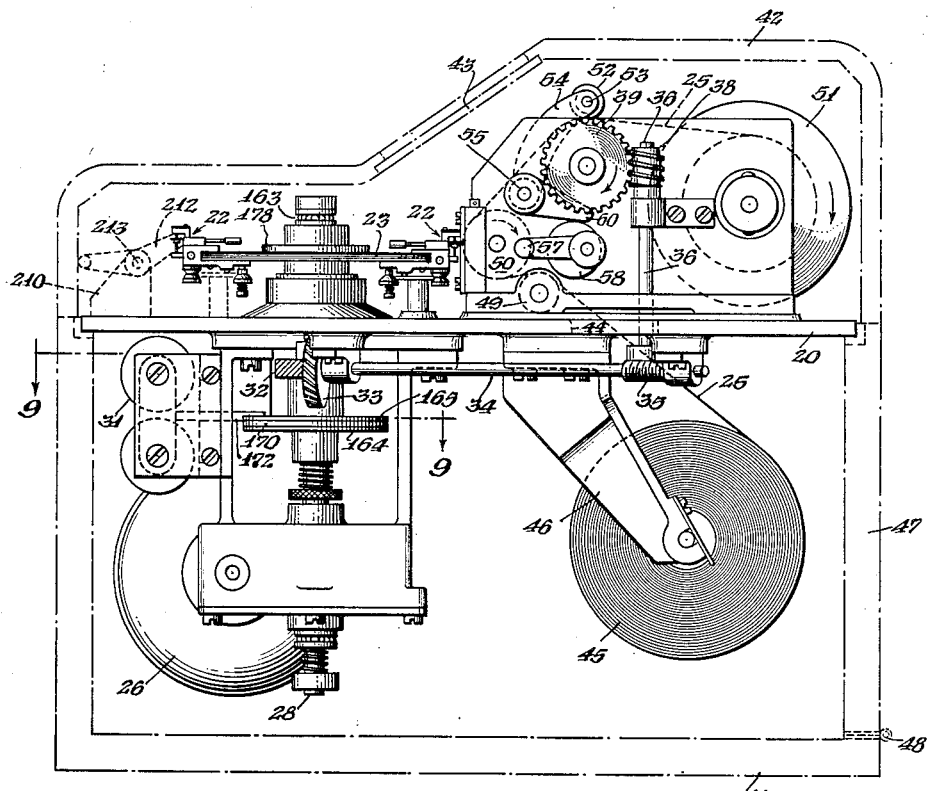
Figure 2 is an end view of the recorder.

The multistylus drive assembly is mounted on top of a cast-iron base 20 as seen in Figures 1, 2 and 3. An endless belt or sprocket chain 21 is used as a carrier for the individual styli 22 and is driven by sprocket gear 23 cooperating with idler sprocket wheel 24. Each stylus 22 is mounted at equi-distant points on chain 21 at intervals substantially equal to the width of the recording sheet 25. Styli 22 are moved in a plane parallel to the base 20 and individually and successively cooperate with the recording sheet once per revolution of the chain 21.

An electric motor 26 is supported beneath recorder base 20 by bracket 27. Motor 26 is preferably of the non-synchronous type operable from an alternating or direct current power supply. Motor 26 is coupled to drive shaft 28 through a worm and worm gear arrangement enclosed in housing 29, and shown in section in Figure 15. Flexible cable 30 is used to connect the motor shaft with the gearing arrangement. The synchronizing magnet 31 supported beneath recorder base 20, as seen in Figures 3 and 15, is responsive to received cyclic impulses and cooperates with the driven mechanism to establish a proper phase position for each stylus 22 at the beginning of the recording excursion. The cyclic synchronizing or phasing action will be further described in detail in connection with Figures 9, 15 and 16. This action is similar to that disclosed in the original copending application hereinabove referred to.

A spiral gear 32 is connected to the synchronized driven shaft 166 (Figure 15) which drives sprocket wheel 23. Figure 2 illustrates pinion 33 meshing with spiral gear 32 for driving the paper sheet. Pinion 33 is secured to rod 34 at the other end of which is connected worm 35. Rod 34 is rotatably supported beneath recorder base 20. Rod 36 is driven by worm 35 through worm gear 37 (seen in Figure 7) meshing therewith. At the other end of rod 36 is another worm 38 cooperating with worm gear 39. Worm gear 39 is connected to feed roll 40 for driving the record sheet 25 in a manner to be further described in connection with Figure 7.

Figure 21:
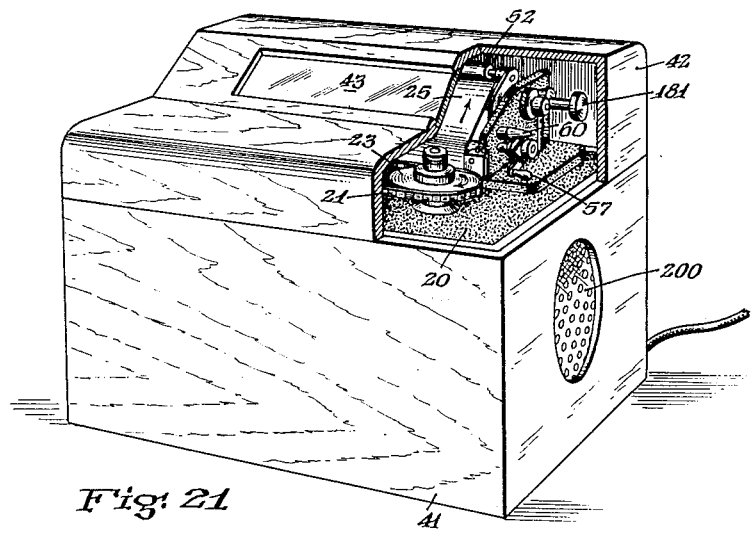
Figure 21 is a perspective view, partially broken away, of the multistylus facsimile recorder of the present invention as mounted in a preferred cabinet structure.

Figure 2 shows the supporting cabinet in dot-dash lines. The recorder base 20 is set into recesses at the top corners of the bottom section 41 of the cabinet. A removable cover 42 fits onto the cabinet 41. Figure 21 is a perspective view of the described cabinet arrangement. A transparent window 43 is set above the recording area in order to permit direct viewing of the recording as it is effected. The window 43 is glass or a transparent plastic that is set into the top cover 42. A roll of sensitive paper 45 is mounted underneath the recorder base 20 between brackets 46—46. The rear side 47 of the cabinet is hinged at 48 to permit the insertion of a new roll of recording paper without otherwise dissembling the recorder. Record sheet 25 passes from roll 45 through an opening 44 in the recorder base 20. Sheet 25 is then threaded under guide roll 49, around platen 50 over drive roll 40, and onto take-up roll 51 as seen in Figures 2 and 4.

A plurality of spaced rubber rollers 52 are arranged on a rod 53 to press record sheet 25 against feed roller 40 during the recording operation. Presser rod 53 is socketed in brackets 54. Brackets 54 are secured to the ends of rod 55 shown in dotted lines in Figure 1. A spiral spring 56 is attached to each end of rod 55 to normally mechanically bias the presser rollers 52 towards feed roller 40. A lever 57 is provided and used when sheet 25 is threaded between the spring biased presser rollers 52 and feed roller 40. As seen in Figure 2, a cam or eccentrically positioned disk 58 is arranged on the axis of support of lever 57. Cam 58 coacts with a finger 60 secured to rod 55. Rotation of handle 57 causes finger 60 to rotate rod 55 against the mechanical bias of springs 56 and thereby move pressure rollers 52 away from roller 40.

A knurled hard rubber knob 61 is secured to the left end of the shaft supporting feed roller 40 to facilitate manipulation of the record sheet. By twirling knob 61, feed roller 40 is independently driven and record sheet 25 may be advanced until all the recorded matter projects beyond the pressure rollers 52. The recording sheet is then torn at the region beyond the pressure rollers and the recorded matter is withdrawn from the facsimile unit by the removal of pick-up roll 51. Pick-up roll 51 is removably supported by the drive shaft 62 and tail stock 63 as will be further disclosed in more detail in connection with Figures 18 and 19.

Figures 9, 10:
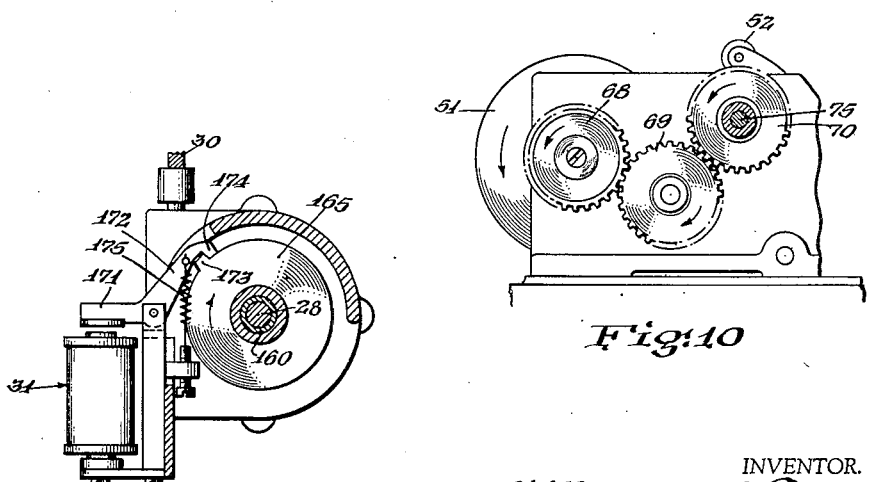
Figure 9 is a broken cross-sectional view taken along 9—9 of Figure 2 showing the cyclic synchronizing mechanism for the recorder.
Figure 10 is the end view corresponding to 10—10 of Figure 1 showing the drive gear arrangement for the paper feed.

A practical feature of my present invention resides in the positive feeding of the record paper and the maintenance of a uniform tension across the recording region of a wide record sheet such as shown at 25. The free end 64 of the record sheet is inserted in a slot 65 in the spool 66 of the pick-up roll 51 as shown in Figure 20. Pick-up roll 51 is mounted for rotation between the frame uprights 67—67 by drive plate 62 and tail stock 63. Drive plate 62 is connected with gear 68 through friction clutch 95—96 as seen in Figures 1 and 19. Gear 68 is coupled to gear 70 by an intermediate idler gear 69 as seen in Figures 1 and 10. Gear 70 is connected to the shaft of positively driven feed roller 40. The gearing ratio between gear 70 and gear 68 is designed to over-drive pick-up roll 51 to maintain a constant tension in the record sheet 25 during the normal feeding operation of recording. A frictional slip occurs at the over-driven feed roll 51 to keep sheet 25 taut, as will be described in further detail in connection with Figures 18 and 19.

Feed or drive roll 40 is motivated through worm gear 39 as heretofore described in connection with Figures 1, 2 and 7. Figure 7 shows in section the connection between worm gear 39 and shaft 75. Roller 40 is pinned to shaft 75. Shaft 75 is mounted in suitable bushings in uprights 67. Worm gear 39 is rotatably mounted on a shoulder 75' extending from shaft 75. A washer 76 is pinned at the end of shoulder 75' abutting the outside end of the hub of gear 39 to keep the worm gear in fixed axial position. A pawl 77 is mounted near the periphery of gear 39. A positive drive connection is effected between worm gear 39 and roller shaft 75 through the pawl 77 and associated ratchet 78. Ratchet 78 is pinned to shoulder 75'. The surface of feed roll 40 is metallic to afford a continuous electrical contact to the recording sheet for electrochemical recording action. The metallic portion of feed roll 40 is connected to ground or frame potential forming the opposite potential to that of the stylus assembly.

As seen in Figure 8, engagement of pawl and ratchet 77—78 occurs when worm gear 39 rotates in a counterclockwise direction. A positive drive is thus effected between worm gear 39 and drive roller 40 in the proper counterclockwise direction during the continuous feeding of record sheet 25 during recording thereon. When knob 61, as seen in Figures 1 and 3, is manipulated to turn shaft 75 counterclockwise, i. e., in the sheet feeding direction, ratchet 78 slips with respect to pawl 77 permitting the feed roll 40 to be advanced independently of the continuous drive thereof through worm gear 39. Manual rotation of shaft 75 and roller 40 causes a corresponding rotation of pick-up roll 51 through the gearing arrangements 68—69—70 (Figure 1). Any recorded matter on sheet 25 may thus be manually advanced onto the pick-up roll 51 for removal from the facsimile unit.

An important feature of my present invention is the arrangement for rigidly guiding each stylus successively in the recording position. In the present embodiment three individual stylus assemblies 22 are shown mounted on link belt 21 at equidistant spacings substantially corresponding to the width of the record sheet 25 (Figure 1). After one stylus has passed through the recording excursion, the next successive stylus is thus in position for starting its recording excursion. The link belt 21 affords a rigid positive driving means for the styli. The whole mobile stylus assembly including the belt drive 21, gears 23 and 24, and guide rail 80 are insulatingly mounted with respect to the remainder of the facsimile unit. The record sheet 25 is at the potential of the frame or base of the unit which is at ground potential. The stylus assembly is insulated from the frame and is at the opposite potential.

In order to insure a rigid linear path for each stylus during the recording excursion, means are provided for maintaining link-belt 21 at a predetermined tension or tautness. Reference is now made to the left end of Figure 3 where means for maintaining the tension in link-belt 21 is shown. Post 81 carrying gear 24 extends from an adjustable member 82. Member 82 is secured to rods 83 and 84. Rods 83 and 84 are slidably mounted in brackets 85 and 86 to base 20. A spring 87 under compression is arranged to mechanically bias rod 83 and therefore member 82 to the left. The force of spring 87 is designed to keep the belt or chain 21 properly taut for carrying the styli 22 successively in their recording path. Any temperature variation which would tend to expand or contract the belt 21 or any wear which may occur in the chain is automatically counteracted and compensated for by the continuous action of spring 87. A predetermined adjustment of tension belt carrier 21 is thus effected. A set screw 88 is arranged on the side of member 82 opposite that of the spring 87 and is used to hold member 82 further against spring 87 when it is desired to remove chain 21 from the associated sprocket wheel. As shown in the drawing, set screw 88 is clear of member 82 after the unit is adjusted, in order that biasing action of spring 87 may be effective on the chain 21.

Figure 17 is a cross-sectional view taken along 17—17 through the compensating mounting for gear 24. Gear 24 is shown secured to post or hub 81 of insulation material having a concentric bushing 89 rotatably mounted on rod 90. Rod 90 is pinned at 91 to adjustable member 82. Pin 92 secures member 82 to rod 83. Member 82 is secured with rod 84 by means of opposed set screws 93—93. Set screws 93 provide variable positioning of member 82 with respect to rod 84. A slot 94 is made in base 20 to permit different positioning of supporting member 82 in maintaining the tension on chain 21.

Figure 5 is an enlarged plan view of a stylus assembly 22 carried by link chain 21 coacting with record sheet 25. Figure 6 is an end view of the stylus assembly. Figure 11 is an enlarged cross-sectional view through the stylus assembly. A flat rail 80 is horizontally mounted upon insulation block 100 parallel to the recording path. Longitudinal edges of rail 80 are rounded to accommodate rollers 101—101 and 102 of each stylus assembly. Two notched rollers 101 are attached beneath the forward portion of the stylus assembly 22 for coacting with the front edge of rail 80. A conical roller 102 is centrally mounted beneath the rear portion of the frame 103 of each stylus. The inclined conical surface of roller 102 coacts with the rear edge of guide rail 80.

The horizontal alignment of the stylus frame or unit is effected by means of a set-screw 105 projecting through frame 103 thereof. At any rate, a hardened rounded bearing point is effected by the bottom of screw 105 for riding on the top surface of rail 80 together. Roller 102 is rotatably mounted on the post 104 projecting beneath stylus frame 103. The bottom end 107 of post 104 is threaded to accommodate a nut 108 used for exerting a pressure against spring 106. Spring 106 mechanically biases conical roll 102 towards the stylus frame 103 and rail 80.

An important feature of my present invention resides in the improved stylus contacting and guiding arrangement for the multistylus continuous recorder. In extensive experimentation with prior known recording points for this type of recorder, I have found that using even the hardest contact points such as tungsten, molybdenum or other metals, undue wear took place when proper recording pressure and reasonable recording speed were used. The stylus point of the prior art wore down so rapidly as to make the multistylus recorder impractical for commercial operation. In accordance with my present invention, I employ a rotatable disk contacting stylus. I have found that such a stylus overcomes the prior difficulties of rapid wearing away in operation. A thin stylus disk 110 is secured to a rotatable rod 112 by means of an integral hub 111. The thickness of the stylus disk 110 is of the order of the thickness of the recording line employed in recording. Thus where 100 contiguous lines per inch are used, the thickness may be one hundredth of an inch or slightly more. The peripheral or contacting edge of the disk 110 is rounded to effect the proper contacting width with the record sheet 25. The stylus disk 110 is made of a hard metal such as tungsten, molybdenum or other suitable metal or alloy. Hub 111 may be machined integral with the disk 110 or brazed or otherwise secured with a wafer disk corresponding to the stylus 110.

The stylus support rod 112 is rotatably mounted in a frame 115 secured to the right end of rod 116 and forms the stylus head of the assembly. Rod 116 is mounted concentrically within sleeve 117. Sleeve 117 is secured to block 118. The position of block 118 with respect to the frame 103 of the stylus assembly is adjustable by means of slots therein coacting with screws 119—119, as seen in Figures 5 and 6. Block 118 is thus horizontally displaceable with respect to the stylus assembly and affixed in position by bolts 119. Block 118 carries with it the whole stylus head including the frame 115 thereof. The proper accurate alignment of each stylus wheel 110 is thus readily adjustable after the unit is assembled in connection with the gauge 210 as shown in Figures 1 and 2 to be hereinafter described.

An important feature of my present invention resides in providing a floating stylus, and guiding the floating stylus in its recording path. As clearly shown in the enlarged sectional view of Figure 11, shaft 112 carrying the disk stylus 110 is freely mounted within the supporting head 115. The stylus shaft 112 is free to rotate and also free to move vertically since the ends of shaft 112 do not abut the end plates 114. Plates 114—114 are fixed opposite the ends of stylus rod 112 to permit insertion or removal thereof from head 115 when required.

The disk stylus is accordingly rigidly maintained in the proper scanning position but is free to rotate and may also be readily displaced vertically by an amount equal to several times the thickness of the stylus disk. I provide an accurately arranged guide for the floating stylus by the two taut parallel wires 140—141. The guide wires 140—141 keep the stylus disk 110 in accurate position in the recording path. Wires 140—141 also prevent any fluttering or parasitic movement of the stylus disk, insuring uniform, high quality, high-speed recording.

An internally threaded cap 120 coacts with the externally threaded end 121 of sleeve 117. A compression spring 122 is mounted within cap 120, pressing against rod 116. The pressure of stylus disk 110 against record sheet 25 is adjustable by means of threaded cap 120 and its action on compression spring 122 against rod 116 for the stylus head. A back stop 125 is attached to block 118 of the stylus assembly in front of the inside portion of stylus holder 115 to fix the outward position of the stylus head. A predetermined pressure of the stylus disk 110 is thus readily effected for recording on sheet 25.

Each stylus assembly is secured to a section of link chain 21 by a rivet 123 embedded between stylus frame 103 and a reentrant elbow 124 thereof as seen in Figure 11. Vertical alignment of the stylus head frame 115 effecting a corresponding horizontal arrangement of stylus wheel 110 is made through the opposed pair of set-screws 126—126 as seen in Figure 6. Set screws 126 press against opposite sides of a portion of frame 115 to properly align it.

Another important advantage of the disk stylus form 110 is the simplified and improved method of maintaining each stylus clean for successive recording operations. A considerable problem of prior multistylus recorders was that of maintaining the stylus point clean for successive recording operations. The use of electro-chemical recording paper such as mercurous oxide or titanium oxide coating on carbon black paper caused quick accumulation of a gummy substance on the prior stylus points. The gummy material caused blurring and smearing of the picture being reproduced. A self-cleansing stylus assembly is effected by mounting wiper blades 130—131 having fingers pressing against the rear surface of the stylus wheel 110 as seen in Figs. 5, 6 and 1'

Wiper blades 130—131 are secured to a projection 132 of block 118. During the recording excursion the stylus disk 110 presses against the record sheet 25 causing the stylus disc 110 to rotate. Rotation of the disk 110 causes the fingers 130—131 to scrape the surface thereof and remove any tarry or gummy substance which may cause smearing or gumming of the record sheet. Wiper blades 130 and 131 are preferably of springy material such as spring steel or phosphor bronze.

Figure 11a shows a modified form for a continuous automatic cleanser of the roller styli. A fluid reservoir 97 having a folded absorbent pad 98 is arranged to coact with a portion of the roller stylus 110. Pad 98 may consist of felt and is held in coaction with the surface of the stylus 110 by set screws as shown, or other suitable means. The middle of pad 98 projects into a fluid contained within the reservoir 97. Felt pad 98 is maintained moist by the chemical fluid A cap 99 on reservoir 97 is used for inserting additional fluid therein. The chemical fluid employed is any suitable one which will dissolve or soften substances which may accumulate on the stylii 110. The moist pad 98 coacts with the stylus 110 as it rolls on the recording excursion, and maintains the stylus clean of gummy or other substances. Reservoir 97 is secured to block 118 in a manner similar to the mounting of the wiper blades 130—131 already described. In order to maintain the floating action of disk 110 the pad 98 is made sufficiently soft, or the reservoir unit 97 may itself be resiliently mounted on block 118 as will be understood by those skilled in the art.

In order to insure accurate travel of the floating stylus wheels 110 in the recording path, I provide a pair of guide wires 140 and 141. Wires 140 and 141 are arranged parallel to the recording path and spaced by a distance equal to the thickness of each recording disk 110. Guide wires 140—141 are held taut and close to the record sheet 25 to prevent any flutter or other irregularity in the motion of the stylus disks 110 and otherwise define their horizontal path. I have found the guide wire arrangement 140—141 particularly useful for high speed recording operation, such as 100 to 200 lines per minute.

Figure 12 is a plan view of the guide wire assembly showing anchor 142 for the wires secured to the left upright 67 of the frame. The tensioning posts 144 and 145 are fixed in block 143 mounted in the right upright 67. Blocks 142 and 143 are of insulation material to electrically isolate the conductive wires 140—141 from the frame.

Guide wires 140 and 141 are arranged adjacent the record sheet 25 at the recording region without contacting therewith. The metallic guide wires necessarily contact the stylus and are therefore of the same electrical potential as the stylus, which is opposite that of the recording sheet. Accordingly the guide wires are electrically clear of the frame, the recording sheet and other associated drive mechanism.

Figure 13 is a cross sectional view along 13—13 of Figure 12 showing the preferred guide wire tensioning arrangement. A slot 146 guides the lower wire 141 into its proper position on block 143. The right end of wire 141 is secured to rod 145 within a hole 147 of post 143. Post 144 and 145 are frictionally positioned in block 143. Tensioning adjustment of wire 141 is effected by turning post 145 by passing a pin or wrench through hole 148 therein to rotate the rod. The tension guide wire 140 is adjusted by post 144 similarly to wire 141. Figure 14 is a cross sectional view through the anchorage block 142 taken along 14—14 in Figure 12. Wires 140 and 141 pass around an appropriate slot 149 in member 142, and the end thereof is anchored under corresponding screws 150.

In order to properly position the stylii upon the common carrier chain 21, I employ a gauge 210 which is mountable by a pair of screws 211 in a predetermined position upon a recorder base 20 as shown in Figures 1 and 2. Gauge 210 comprises a lever 212 pivoted at 213 thereon. The frames of the styli 22 are fastened close to their predetermined equi-distant positions along the carrier belt 21 by rivets as already described. Nevertheless, for proper recording, it is necessary to perfectly align the styli.

Manual adjustment and alignment of the styli disks 110 is performed as follows: The adjustment is entirely mechanical and no electrical currents are applied to the unit. Chain 21 is moved until it is locked due to the engagement of the synchronizing lever 172 with the cam 165 as seen in Figure 9, when the driving means for sprocket wheel 23 is locked, preventing the movement of the belt 21. Lever 212 of the gauge 210 is positioned so that when it abuts one side of the stylus disk 110 as shown in Figure 1, the stylus would be in the proper recording position when it engages the record sheet. Stylus disk 110 is accordingly adjusted until it becomes tangent to the inside surface of gauge lever 212.

The shifting or adjustment of block 118 is effected by means of the adjusting screws 119—119 passing through the slotted block 118 already described in connection with Figures 5 and 6. Block 118 upon which stylus disk 110 is mounted is shiftable to the right or left and maintained in fixed position when screws 119—119 are tightened thereon. Proper scanning alignment of disk 110 is thus effected. The position of the next successive stylus is similarly adjusted by releasing the engagement of lever 172 with cam 165 of the synchronizing mechanism to permit the chain to move a distance equal to another scanning line when the drive mechanism is locked again. The procedure already described is performed for accurately positioning the next stylus disk 110. The same procedure is followed until the third stylus disk 110 is properly aligned.

Figure 15 is a cross sectional view taken through the mechanism for insuring synchronous driving of the recorder with the transmitter. This arrangement is essentially similar to that disclosed in my copending application Serial No. 165,448, referred to above. As there described, cyclic synchronizing signals are received with the facsimile signals and caused to actuate the synchronizing magnet 31. Worm 160 is mounted within housing 29 and is attached to the flexible shaft 30 continuously driven by motor 26 as viewed in Figure 3. Coacting worm gear 161 accordingly continuously drives central shaft 28 to which it is keyed. Roller thrust bearing 162 and 163 support shaft 28. A friction clutch 164—165 is connected between continuously rotating shaft 28 and spiral gear 32. It will be recalled that gear 32 effects the driving of the drive roller 40 for feeding record sheet 25 as previously described in connection with Figure 2. Member 164 of the clutch is pinned to shaft 28. The coacting member 165 of the clutch is fastened to a sleeve 166 concentric about the upper half of shaft 28. Spiral gear 32 as well as a synchronizing cam 167 are secured to this driven sleeve 166. The hub 168 of the linked chain drive wheel 123 is made of insulation material and secured to the same driven sleeve 166. Sleeve 166 is supported by roller bearing 169 mounted in the frame.

A friction layer 170 between clutch blades 164 and 165 causes continuous driving of the belt 21 and sheet drive gear 32 as long as the recorder is in synchronous movement and the upper disk 165 is not arrested from rotation. Reference is herewith made to Figures 2 and 9 for an understanding of the operation of the upper clutch member 165 in conjunction with synchronizing magnet 31. Armature 171 coacting with magnet 31 has an extending lever 172 cooperating with the peripheral surface of disk 165. A projection 173 of clutch disk 165 abuts projection 174 of lever 172 at the end of each recording excursion if the recorder is not in phase synchronism with the transmitter. When the cyclic synchronizing signal is received and magnet 31 is energized thereby, armature 171 is attracted thereto against the bias of spring 175, releasing engaged projection 173 to free the clutch disk 175 for rotation. Each recording excursion of the stylus is thus started in proper phase synchronous position with the corresponding transmitted scanning line.

Figure 16 illustrates the cyclic actuation of the synchronizing switch 176 by synchronizing cam 167 through a pin 177 set in the frame. Synchronizing switch 176 actuates synchronizing circuits not shown herewith but fully described in my copending application Serial No. 165,448 already referred to and also in my Patent No. 2,047,863 which issued July 14, 1936. It is to be understood that the electrical transmission and receiver circuits, the synchronizing circuits, and the picture rectifying circuits, as well as the ancillary circuits for utilizing the facsimile recorder may be such as those already described in the referred to application or patent, or in any other manner, as will be understood by those skilled in the art. The present case is directed to the recorder per se and improvements therein.

The arrangement for maintaining the wide record sheet 25 taut during continuous feeding thereof has already been referred to in connection with the description of pick-up roll 51 in connection with Figures 1 and 10. Pick-up roll 51 is geared for overdriving so that its rate of rotation would normally tend to be faster than that at which feed roll 40 motivates the sheet. I provide a friction clutch 95—96 within the driving connection for the pick-up roll 51 in order that a slip may occur therein. The overdrive and clutch slip permit a uniform and taut pick-up of the sheet 25 after recording despite the increase in diameter of the pick-up roll during operation.

Figures 18 and 19 are cross-sectional views through the right and left mountings respectively of the pick-up roll 51. Figure 18 illustrates the tail stock 63 comprising the spring biased spindle 180 attached to knurled knob 181. Pointed spindle 180 presses against a cavity in the wooden core of the roll 51.

Figure 19 is a cross-sectional view through the slip clutch drive of the pick-up roll 51. As already described, gear 68 is driven directly from the feed roll gear 70 (Fig. 10). Gear 68 is mounted to freely rotate about shaft 185. Clutch members 95 and 96 have frictional surfaces contiguous with the corresponding sides of gear 68. Clutch member 96 is pinned to shaft 185 by pin 186. Shaft 185 engages clutch member 95 through pin 187 affixed to the hub of member 195. Shaft 185 is axially slotted at 188 in order that pin 187 may be slidable therein. A threaded nut 190 coacts with the threaded exterior of shaft 185. Spring 191 is placed between nut 190 and clutch member 95 to spring bias the clutch into engagement with the rotatably mounted gear 68. The opposite end of shaft 185 is secured to drive plate 162 engaging an end of the pick-up roll 51. Driving of gear 68 accordingly drives pick-up roll 51 through the clutch 95—96 biased to the gear. This driving arrangement permits slippage of the pick-up roll and keeps the recording sheet 25 taut at the recording position.

Figure 21 is a perspective view of a table model of the facsimile recorder of my present invention with the cover partially broken away. The base 20 of the recorder is set into the top inside corners of the base 41 as already described in connection with Figure 2. The top cover 42 covers the remainder of the unit and contains the transparent pane 43 positioned for viewing the recording directly. A perforated opening 200 is placed in one or more sides of the cabinet 41 to facilitate ventilation due to the heating of the contained motor or the like. It will be noted that the recorder is horizontally disposed and permits a compact arrangement with the oblong cabinet 41. The cover 42 of the cabinet is shallow and presents a pleasing appearance, yet serving the important function of permitting a direct view of the recording as it progresses.

Figure 22:
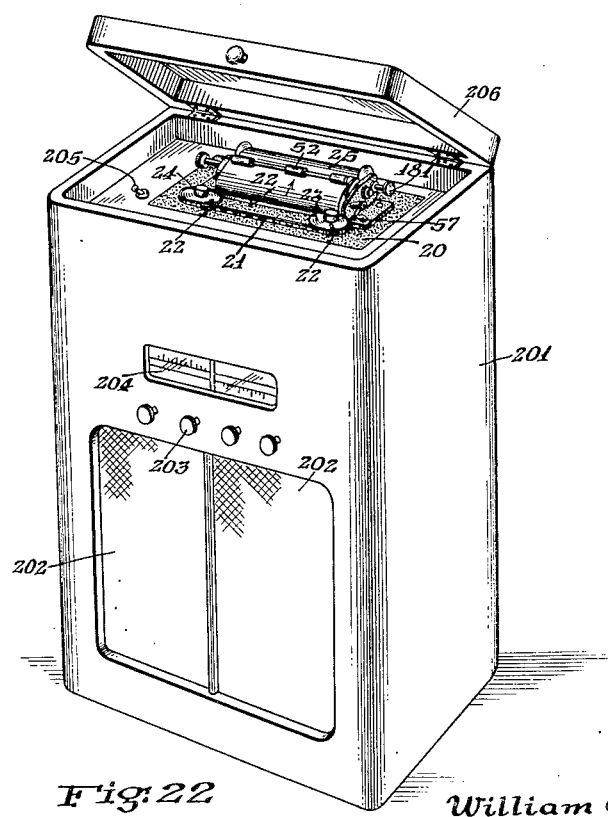
Figure 22 is a perspective view of the multistylus facsimile recorder of the present invention mounted in combination with a broadcast radio receiver.

Figure 22 is a perspective view of the recording unit mounted at the top of a radio cabinet 201 also housing a broadcast radio receiver. The loud speaker 202, control knobs 203 and the station indicator 204 are similar to those in ordinary broadcast receivers. However, the circuits used in receiving sound signals from the broadcast stations may be combined with the essential circuits for receiving the facsimile signals. The combined radio and facsimile circuits may be such as disclosed in my copending application Serial No. 165,448 and Patent No. 2,047,863. The changeover may be effected by simply flipping a manual switch 205 adjacent the facsimile recorder to convert the circuit from sound reproduction to facsimile reproduction. A hinged cover 206 is arranged to permit ready access and viewing of the recorder unit.

The recording sheet 25 is a dry sheet which has first been impregnated with carbon as, for example, with the pulp during the manufacture of the sheet. This provides the necessary conductivity to the sheet.

One side of the sheet is now coated with a metal oxide such as titanium oxide ($TiO_2$) suspended in a finely divided state in lacquer such as nitrocellulose. The lacquer acts as a binder and bonds the metal oxide to the surface of the sheet.

This metal oxide makes one side of the sheet white and is discolored black by current flowing from the stylus to the opposite carbon surface, acting as the second contact.

It will be apparent that the metal oxide coating must be so chosen as to give high conductivity to the sheet and is responsive to small current flow to discolor and set off the image being transmitted with sufficient contrast. Moreover, the coating must be non-inflammable, must be uniformly applied because small variations may affect the conductivity of the layer, and must have a composition of the order of emulsion compositions of films.

In order to increase the conductivity and to improve the white appearance of the paper, aluminum powder is added in such quantities as are possible without making the deposited solution turn gray.

In addition to the aluminum powder, metallic salts such as cadmium iodide, potassium iodide, lithium iodide, nickel chloride and iron chloride which also increase conductivity and help make the sheet non-inflammable may be added. The composition may, for example, be of the following proportions:

About three pounds of titanium oxide ($TiO_2$) to a gallon of lacquer; 4 ounces of aluminum powder and 2 ounces of cadmium iodide or other similar salt.

The mix is then coated on to the carbon paper and dried to volatilize the solvents.

Although cellulose lacquer has been described as the binder, other binders such, for example, as cellulosic ether or a dextrine, or casein binder may be employed.

The resulting product is a carbon sheet having one surface coated white and conducting about ten milliamperes at about 300 volts to produce small black dots.

Although I have described preferred arrangements for carrying out the principles of my present invention, it is to be understood that they may be modified by those skilled in the art and still fall within the broader spirit and scope of the invention. Accordingly, I do not intend to be limited except as set forth in the following claims.

I claim:

1. A multistylus facsimile recorder comprising an endless carrier for successively carrying the styli in the recording path, two spaced rotatable members operatively carrying said carrier, and means for mechanically biasing said members apart to maintain said carrier at a predetermined taut condition.

2. A multistylus facsimile recorder comprising a chain carrying the styli, two spaced rotatable members operatively carrying said chain, and means for mechanically biasing said members apart to maintain said chain at a predetermined taut condition.

3. A multistylus facsimile recorder comprising an endless chain for successively carrying the styli in the recording path, two spaced rotatable gear members operatively carrying said chain, and means for mechanically biasing said members apart to maintain said chain at a predetermined taut condition comprising an element supporting one of said members, structure slidably supporting said element, and a spring arranged to press against said element.

4. A recording unit comprising a chain, a stylus carried thereby, a frame carrying said stylus in a floating condition free transversely of the recording path, and means for rigidly holding said stylus in the recording path including a pair of elements arranged parallel to the recording path for gripping said floating stylus during the recording excursion thereof.

5. A recording unit comprising a stylus in the form of a flat circular disk, a rod secured to said stylus substantially at the geometric center thereof, a frame carrying said rod in a floating condition, and means for rigidly holding said stylus in the recording path including a pair of wires arranged parallel to the recording path for gripping said floating stylus during the recording excursion thereof.

6. A facsimile stylus assembly comprising a circular disk, means for moving said disk in the recording path in a rotatably free condition whereby said disk will continuously mark the record sheet during the recording excursion thereof in a rolling contacting manner, and means secured to said stylus assembly for continuously cleansing said disk of accumulated matter as said disk is rotated during recording.

7. A facsimile stylus assembly comprising a circular disk, means for moving said disk in the recording path in a rotatably free condition whereby said disk will continuously mark the record sheet during the recording excursion thereof in a rolling contacting manner, and means secured to said stylus assembly for continuously cleansing said disk of accumulated matter as said disk is rotated during recording comprising a pair of wiper blades coacting with opposed surfaces of said disk.

8. A facsimile stylus assembly comprising a circular disk having a peripheral surface adapted for contact marking of a record sheet, means for moving said disk in the recording path in a rotatably free condition whereby said disk will continuously mark the record sheet during the recording excursion thereof in a rolling contacting manner, and means secured to said stylus assembly for continuously cleansing said disk of accumulated matter as said disk is rotated during recording comprising a fluid reservoir having an absorbent pad coacting with a section of said disk.

9. A facsimile recording unit for a multistylus recorder comprising a stylus element, structure for carrying said stylus including a frame and a rod projecting from said frame, a sleeve surrounding said rod, a cap fastenable to an end of said sleeve, and a spring enclosed by said cap arranged to press against said rod and mechanically bias said stylus against the record sheet with a predetermined pressure.

10. A facsimile recording unit for a multistylus recorder comprising a stylus element, structure for carrying said stylus including a frame and a rod projecting from said frame, a sleeve surrounding said rod, a cap fastenable to an end of said sleeve, a spring enclosed by said cap arranged to press against said rod and mechanically bias said stylus against the record sheet with a predetermined pressure, and a stop secured to said unit for fixing the extreme outward position of such biased stylus when out of recording position.

11. A facsimile recording unit for a multistylus recorder comprising a stylus disk, structure for rotatably carrying said stylus including a frame and a rod projecting from said frame, said stylus being floatingly supported in said frame in a direction transverse to the recording path, a sleeve surrounding said rod, a cap fastenable to an end of said sleeve, a spring enclosed by said cap arranged to press against said rod and mechanically bias said stylus against the record sheet with a predetermined pressure, and a member for carrying said sleeve having transversely slotted openings for permitting adjustable positioning of said stylus on the common stylus carrier in a direction along the recording path direction.

12. A facsimile recording unit for a multistylus recorder comprising a stylus element, structure for carrying said stylus including a frame and a rod projecting from said frame, a sleeve surrounding said rod, a member for carrying said sleeve, and a pair of opposed set screws supported in said unit arranged on opposite sides of a portion of said rod supported frame for aligning said frame with respect to said unit.

3. A multistylus facsimile recorder comprising a chain carrying the styli, two spaced rotatable members operatively carrying said chain, and means for automatically maintaining said members in spaced position to continuously exert a predetermined tension on said chain, said means comprising an element supporting one of said members and responsive to variations in tension of the chain.

14. A multistylus facsimile recorder comprising an endless chain for successively carrying the styli in the recording path, two spaced rotatable gear members operatively carrying said chain, and means for automatically maintaining said members in spaced position to continuously exert a predetermined tension on said chain, said means comprising an element supporting one of said members and responsive to variations in tension of the chain to continuously restore said chain to predetermined taut condition.

WILLIAM G. H. FINCH.